(12) United States Patent
Bi

(10) Patent No.: US 9,413,725 B2
(45) Date of Patent: Aug. 9, 2016

(54) VPN SERVER ACCESS METHOD AND VPN CLIENT

(71) Applicant: SUZHOU SNAIL TECHNOLOGY DIGITAL CO., LTD, Suzhou (CN)

(72) Inventor: Jingjing Bi, Shenzhen (CN)

(73) Assignee: SUZHOU SNAIL TECHNOLOGY DIGITAL CO., LTD (CN)

( * ) Notice: Subject to any disclaimer, the term of this patent is extended or adjusted under 35 U.S.C. 154(b) by 0 days.

(21) Appl. No.: 14/560,751

(22) Filed: Dec. 4, 2014

(65) Prior Publication Data

US 2016/0164838 A1    Jun. 9, 2016

(51) Int. Cl.
| | | |
|---|---|---|
| *G06F 9/00* | (2006.01) | |
| *H04L 29/06* | (2006.01) | |
| *H04L 29/12* | (2006.01) | |

(52) U.S. Cl.
CPC ........ *H04L 63/0272* (2013.01); *H04L 61/2007* (2013.01); *H04L 61/6068* (2013.01)

(58) Field of Classification Search
CPC ................................... H04L 63/0272
USPC .......................................................... 726/15
See application file for complete search history.

(56) References Cited

U.S. PATENT DOCUMENTS

| | | | | |
|---|---|---|---|---|
| 2006/0002384 | A1* | 1/2006 | Chen ................... | H04L 12/4604 370/389 |
| 2010/0033573 | A1* | 2/2010 | Malinovski ....... | G08B 13/19656 348/158 |
| 2012/0113899 | A1* | 5/2012 | Overmars ........... | H04M 1/2535 370/328 |

FOREIGN PATENT DOCUMENTS

CN    103428062 A  * 12/2013

OTHER PUBLICATIONS

Ala-Laurila et al., Wireless LAN Access Network Architecture for Mobile Operators, Nov. 2001, IEEE Communications Magazine, 0163-6804/01, pp. 82-89.*

\* cited by examiner

*Primary Examiner* — Peter Shaw
(74) *Attorney, Agent, or Firm* — Hayes Soloway P.C.

(57) ABSTRACT

Disclosed in the embodiments of the present invention is a VPN server access method, comprising: acquiring an IP address assigned to a SIM card by a server at the network side, when dialing to the server at the network side is carried out successfully with the dial-up information built-in the SIM card; connecting to the proprietary VPN server automatically, if the acquired IP address of the SIM card belongs to the address segments of the proprietary VPN server. A VPN client is also disclosed in the embodiments of the present invention. With the present invention, the user experience can be improved.

6 Claims, 4 Drawing Sheets

VPN SERVER ACCESS METHOD AND VPN CLIENT

I. TECHNICAL FIELD

The present invention relates to the field of communication, in particular to a VPN server access method and a VPN client.

II. BACKGROUND ART

At present, a proprietary user of SIM card bound with proprietary VPN (Virtual Private Network) service has to create a VPN profile manually in advance (e.g., set the address of a VPN server) before he/she can access the VPN server from a VPN client (e.g., a mobile terminal running Android system), and has to input his/her user name and password every time he/she connects to the VPN server. Consequently, the user experience is unsatisfactory.

III. DISCLOSURE OF THE INVENTION

The technical problem solved in the embodiments of the present invention is to provide a VPN server access method and a VPN client, which can access the VPN server automatically, and thereby the user experience is improved.

To solve the technical problem described above, in the embodiments of the present invention, a VPN server access method is provided, comprising:

acquiring an IP address assigned to a SIM card by a server at the network side, when dialing to the server at the network side is carried out successfully with the dial-up information built-in the SIM card;

connecting to the proprietary VPN server automatically, if the acquired IP address of the SIM card belongs to the address segments of the proprietary VPN server.

Wherein, the step of connecting to the proprietary VPN server automatically if the acquired IP address of the SIM card belongs to the address segments of the proprietary VPN server comprises:

acquiring the address of the proprietary VPN server, if the acquired IP address of the SIM card belongs to the address segments of the proprietary VPN server;

acquiring the login account for logging in the proprietary VPN server; and establishing a network connection to the proprietary VPN server, according to the acquired address of the proprietary VPN server and the login account.

Wherein, the step of acquiring the IP address of the proprietary VPN server if the acquired IP address of the SIM card belongs to the address segments of the proprietary VPN server comprises:

querying for the address of the proprietary VPN server in a preset server address information base, if the acquired IP address of the SIM card belongs to the address segments of the proprietary VPN server;

acquiring the login account for logging in the proprietary VPN server, if the query is successful; and prompting the user to input the address of the proprietary VPN server, and storing the VPN server address inputted by the user into the server address information base, if the query is failed.

Wherein, the step of acquiring the login account for logging in the proprietary VPN server comprises:

querying for the login account for logging in the VPN server in a preset login account information base;

establishing a network connection to the proprietary VPN server, according to the address of the VPN server and the login account, if the query is successful; and prompting the user to input an appropriate login account, and storing the login account inputted by the user into the login account information base, if the query is failed.

Wherein, the method further comprises the following step after the step of establishing a network connection to the VPN server according to the acquired address of the VPN server and the login account:

detecting whether the network connection to the VPN server is interrupted, and, if the network connection is interrupted, establishing the network connection to the VPN server again according to the acquired address of the proprietary VPN server and the login account.

Accordingly, in the embodiments of the present invention, a VPN client is provided, comprising:

an IP address acquiring module, designed to acquire an IP address assigned to a SIM card by a server at the network side, when dialing to the server at the network side is carried out successfully with the dial-up information built-in the SIM card; and a connecting module, designed to connect to the proprietary VPN server automatically if the acquired IP address of the SIM card belongs to the address segments of the proprietary VPN server.

Wherein, the connecting module comprises:

a VPN server address acquiring unit, designed to acquire the address of the proprietary VPN server if the acquired IP address of the SIM card belongs to the address segments of the proprietary VPN server;

a login account acquiring unit, designed to acquire the login account for logging in the proprietary VPN server; and a network connection establishing unit, designed to establish a network connection to the proprietary VPN server according to the acquired address of the VPN server and the login account.

Wherein, the VPN server address acquiring unit comprises:

a first querying sub-unit, designed to query for the address of the proprietary VPN server in the preset server address information base; and a first processing sub-unit, designed to acquire the login account for logging in the proprietary VPN server if the query made by the first querying sub-unit is successful; and, prompt the user to input the VPN server address and store the VPN server address inputted by the user into the server address information base if the query made by the first querying sub-unit is failed.

Wherein, the VPN login account acquiring unit comprises:

a second querying sub-unit, designed to query for the login account for logging in the proprietary VPN server in the preset login account information base; and a second processing sub-unit, designed to establish a network connection to the VPN server according to the address of the proprietary VPN server and the login account if the query made by the second querying sub-unit is successful; and, prompt the user to input an appropriate login account and store the login account inputted by the user into the login account information base if the query made by the second querying sub-unit is failed.

Wherein, the VPN client further comprises:

a detecting module, designed to detect whether the network connection to the VPN server is interrupted, and, if the network connection is interrupted, establish the network connection to the VPN server again according to the acquired address of the proprietary VPN server and the login account.

The embodiments of the present invention attain the following beneficial effects:

In the embodiments of the present invention, the VPN server accessed by the SIM card is ascertained on the basis of the IP address acquired from the server at the network side; thus, the VPN server can be connected automatically, and the user experience is improved.

IV. BRIEF DESCRIPTION OF THE DRAWINGS

To make the technical solution in the embodiments of the present invention or in the prior art understood better, hereunder the accompanying drawings used in the description of the embodiments or the prior art will be introduced briefly. Apparently, the accompanying drawings described below only illustrate some embodiments of the present invention. Those having ordinary skills in the art can obtain drawings of other embodiments on the basis of these drawings without creative labor.

V. EMBODIMENTS OF THE PRESENT INVENTION

Hereunder the technical solution of the present invention will be detailed clearly and completely in embodiments with reference to the accompanying drawings. Apparently, the described embodiments are only some embodiments of the present invention, but not all embodiments of the present invention. Other embodiments obtained by those having ordinary skills in the art without creative labor on the basis of the embodiments provided here shall be deemed as falling into the protected domain of the present invention.

Figure 1:
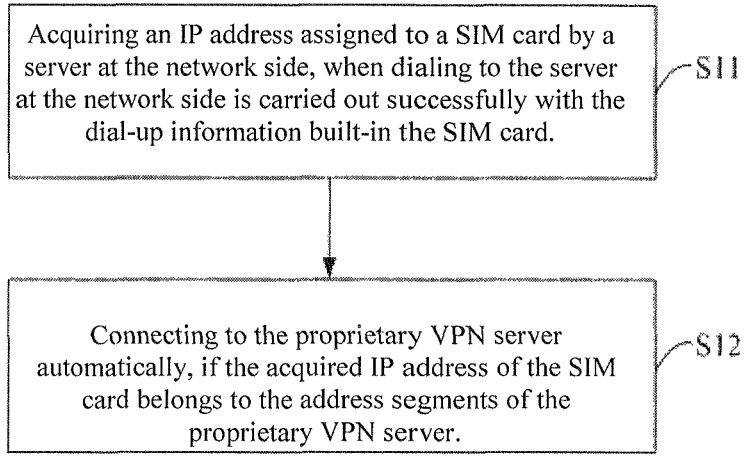
FIG. 1 is a flow chart of a first embodiment of the VPN server access method in the present invention.

Please see FIG. 1, which is a flow chart of a first embodiment of the VPN server access method in the present invention. The method comprises:

step S11: acquiring an IP address assigned to a SIM card by a server at the network side, when dialing to the server at the network side is carried out successfully with the dial-up information built-in the SIM card;

the dial-up information built-in the SIM card comprises the Network ID of the operator to which the SIM card belongs, wherein, for example, the Network ID of China Mobile is 46000, and the Network ID of China Unicom is 46001;

in the embodiment of the present invention, before step S11 is executed, whether APN (Access Point Name) dialing is triggered by a user or an application program according to the dial-up information built-in the SIM card is monitored, and, if successful dialing to the server at the network side (e.g., China Mobile or China Unicom) is detected, an IP address assigned by the server of the operator can be acquired at a P2P (Peer to Peer) port;

step S12: connecting to the proprietary VPN server automatically, if the acquired IP address of the SIM card belongs to the address segments of the proprietary VPN server;

the proprietary VPN server is a specific VPN server that can be accessed by the SIM card, wherein, the VPN server can be a server at the network side which provides specific resources, such as educational resources or game resources, etc;

In the embodiments of the present invention, the VPN server accessed by the SIM card is ascertained on the basis of the IP address acquired from the server at the network side; thus, the VPN server can be connected automatically, and the user experience is improved.

Figure 2:
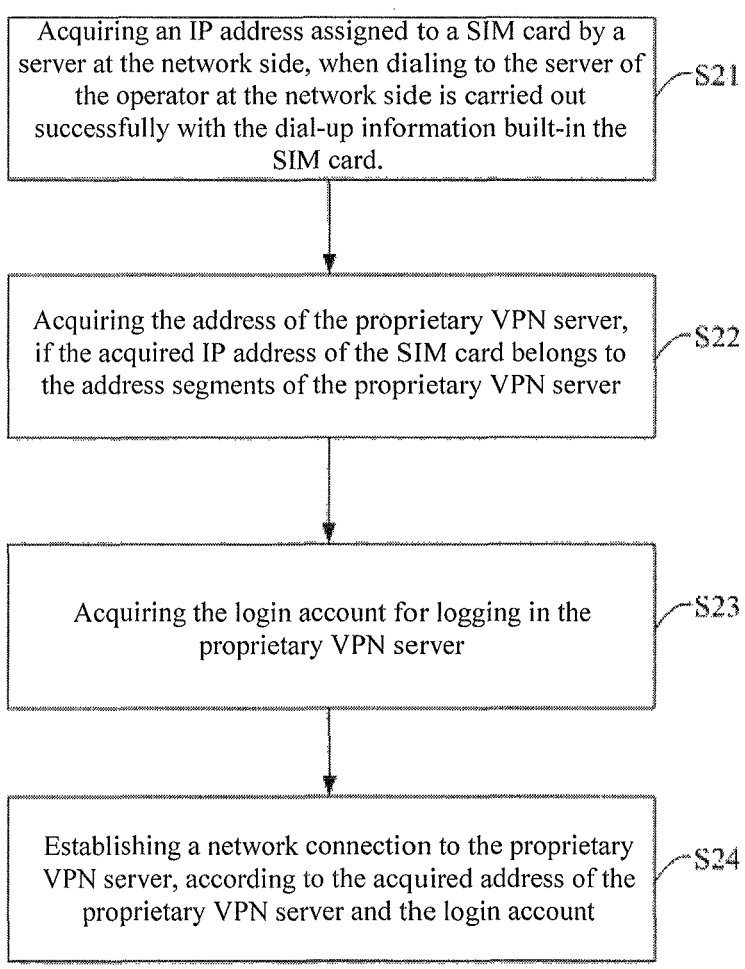
FIG. 2 is a flow chart of a second embodiment of the VPN server access method in the present invention.

Please see FIG. 2, which is a flow chart of a second embodiment of the VPN server access method in the present invention. The method comprises:

step S21: acquiring an IP address assigned to a SIM card by a server at the network side, when dialing to the server at the network side is carried out successfully with the dial-up information built-in the SIM card;

the dial-up information built-in the SIM card comprises the Network ID of the operator to which the SIM card belongs, wherein, for example, the Network ID of China Mobile is 46000, and the Network ID of China Unicom is 46001;

in the embodiment of the present invention, before step S21 is executed, whether APN dialing is triggered by a user or an application program according to the dial-up information built-in the SIM card is monitored, and, if successful dialing to the server at the network side (e.g., China Mobile or China Unicom) is detected, an IP address assigned by the server of the operator can be acquired at a p2p port;

step S22: acquiring the address of the proprietary VPN server, if the acquired IP address of the SIM card belongs to the address segments of the proprietary VPN server;

the address of the VPN server can be acquired from a preset server address information base, generally speaking, the address of the VPN server has the same Network ID as the IP address assigned by it to the client; thus, the server address that has the same Network ID as the IP address can be acquired in the server address information base, so that the VPN server to be accessed by the SIM card and the address of the said VPN server can be ascertained;

moreover, the server address information base can not only store the address of a proprietary VPN server for the SIM card in advance but also store the addresses of other servers accessed frequently by the user;

step S23: acquiring the login account for the proprietary VPN server;

the login account for the VPN server comprises: user name and password required for logging in the VPN server;

the login account for the proprietary VPN server can be acquired from a preset login account information base; on the premise that the proprietary VPN server to be accessed by the SIM card is ascertained in step S22, the login account for the proprietary VPN server can be acquired in the login account information base according to the address and name of the VPN server;

moreover, the login account information base can store in advance not only login accounts for the proprietary VPN server with the SIM card but also login accounts for servers that are often accessed by the user;

step S24: establishing a network connection to the proprietary VPN server, according to the acquired address of the proprietary VPN server and the login account.

In the embodiments of the present invention, the VPN server accessed by the SIM card is ascertained on the basis of the IP address acquired from the server at the network side; thus, the VPN server can be connected automatically, and the user experience is improved.

Figure 3:
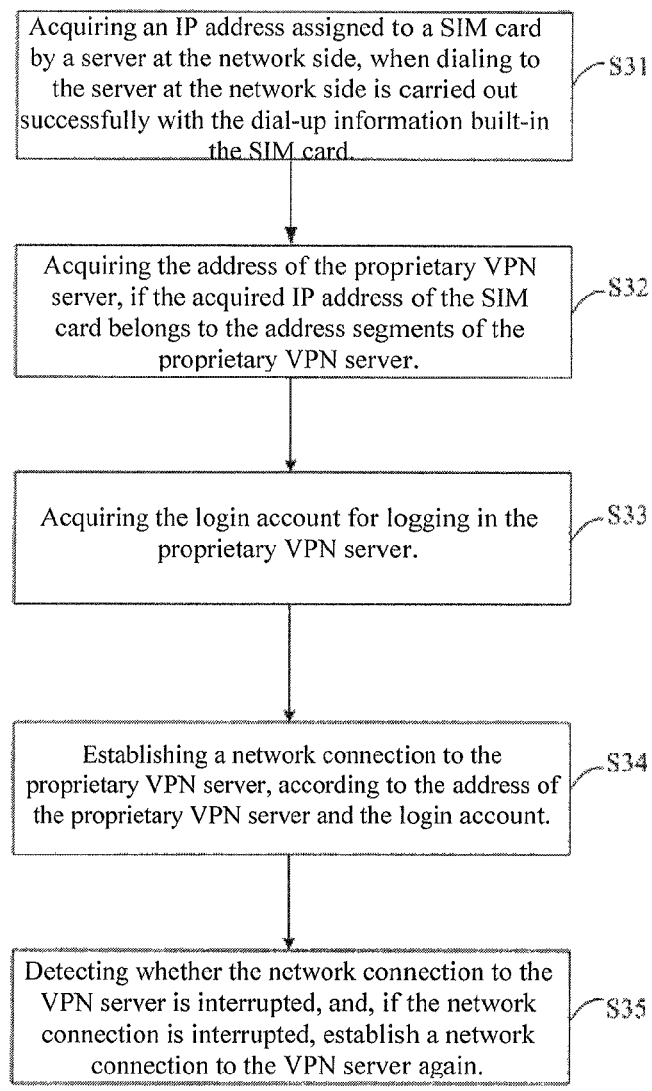
FIG. 3 is a flow chart of a third embodiment of the VPN server access method in the present invention.

Please see FIG. 3, which is a flow chart of a third embodiment of the VPN server access method in the present invention. The method comprises:

step S31: acquiring an IP address assigned to a SIM card by a server at the network side, when dialing to the server at the network side is carried out successfully with the dial-up information built-in the SIM card;

the dial-up information built-in the SIM card comprises the Network ID of the operator to which the SIM card belongs, wherein, for example, the Network ID of China Mobile is 46000, and the Network ID of China Unicom is 46001;

in the embodiment of the present invention, before step S31 is executed, whether APN dialing is triggered by a user or an application program according to the dial-up information built-in the SIM card is monitored, and, if successful dialing to the server at the network side (e.g., China Mobile or China Unicom) is detected, an IP address assigned by the server of the operator can be acquired at a p2p port;

step S32: acquiring the address of the proprietary VPN server in a preset server address information base, if the acquired IP address of the SIM card belongs to the address segments of the proprietary VPN server;

the address of the VPN server can be acquired from a preset server address information base, generally speaking, the address of the VPN server has the same Network ID as the IP address assigned by it to the client, thus, the server address that has the same Network ID as the IP address can be queried for in a server address information base; if the query is successful, step S33 will be executed; if the query is failed, the user will be prompted to input the address of the VPN server, and the address of the VPN server inputted by the user will be stored in the server address information base; thus, the VPN server to be accessed by the SIM card and the address of the VPN server are ascertained;

moreover, the server address information base can not only store the address of a proprietary VPN server for the SIM card in advance but also store the addresses of other servers accessed frequently by the user;

step S33: acquiring the login account for the VPN server in a preset login account information base;

the login account for the VPN server comprises: user name and password required for logging in the VPN server;

the login account for logging in the proprietary VPN server can be acquired from a preset login account information base; on the premise that the proprietary VPN server to be accessed by the SIM card is ascertained in step S32, the login account for the proprietary VPN server can be queried for in the login account information base according to the address and name of the VPN server; if the query is successful, step S34 will be executed; if the query is failed, the user will be prompted to input an appropriate login account, and the login account inputted by the user will be stored in the login account information base;

moreover, the login account information base can store in advance not only login accounts required for the proprietary VPN server with the SIM card but also login accounts for servers that are frequently accessed by the user;

step S34: establishing a network connection to the proprietary VPN server, according to the acquired address of the proprietary VPN server and the login account;

step S35: detecting whether the network connection to the VPN server is interrupted, and, if the network connection is interrupted, establishing the network connection to the VPN server again according to the acquired address of the proprietary VPN server and the login account.

In the embodiments of the present invention, the VPN server accessed by the SIM card is ascertained on the basis of the IP address acquired from the server at the network side; thus, the VPN server can be connected automatically, and the user experience is improved.

The VPN server access method is detailed above in the embodiments with reference to FIG. 1-3. The device that executes the VPN server access method can be a VPN client, such as a mobile terminal that runs Android system, or a computer that runs Windows system, etc.

After expatiating some embodiments of the VPN server access method in detail, hereunder the device that executes the method will be described with reference to the accompanying drawings.

Figure 4:
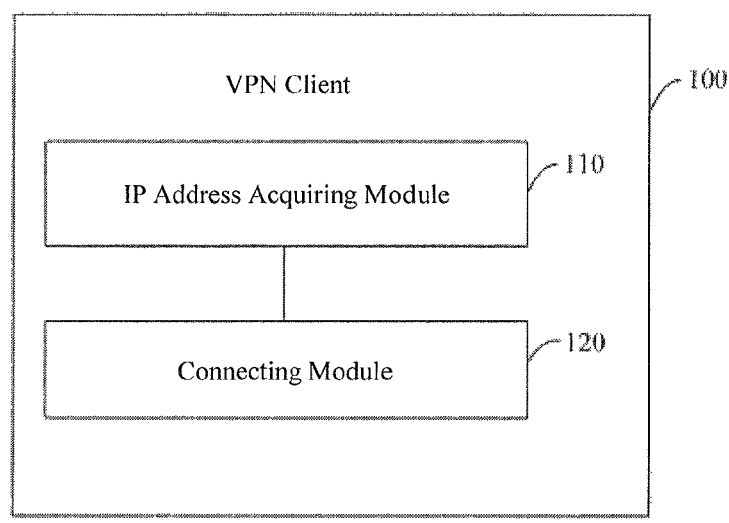
FIG. 4 is a schematic structural diagram of a first embodiment of the VPN client in the present invention.

Please see FIG. 4, which is a schematic structural diagram of a first embodiment of the VPN client in the present invention. As shown in the figure, the VPN client 100 comprises:

an IP address acquiring module 110, designed to acquire the IP address assigned to a SIM card by a server at the network side, when dialing to the server at the network side is carried out successfully with the dial-up information built-in the SIM card;

the dial-up information built-in the SIM card comprises the Network ID of the operator to which the SIM card belongs, wherein, for example, the Network ID of China Mobile is 46000, and the Network ID of China Unicom is 46001;

before the IP address is acquired, the IP address acquiring module 110 monitors whether APN dialing is triggered by a user or an application program according to the dial-up information built-in the SIM card, and if successful dialing to the server at the network side (e.g., China Mobile or China Unicom) is detected, an IP address assigned by the server of the operator can be acquired at a p2p port;

a connecting module 120, designed to connect to the proprietary VPN server automatically if the acquired IP address of the SIM card belongs to the address segments of the proprietary VPN server;

the proprietary VPN server is a specific VPN server that can be accessed by the SIM card, wherein, the VPN server can be a server at the network side, which provides specific resources, such as educational resources or game resources, etc.

In the embodiments of the present invention, the VPN server accessed by the SIM card is ascertained on the basis of the IP address acquired from the server at the network side; thus, the VPN server can be connected automatically, and the user experience is improved.

Figure 5:
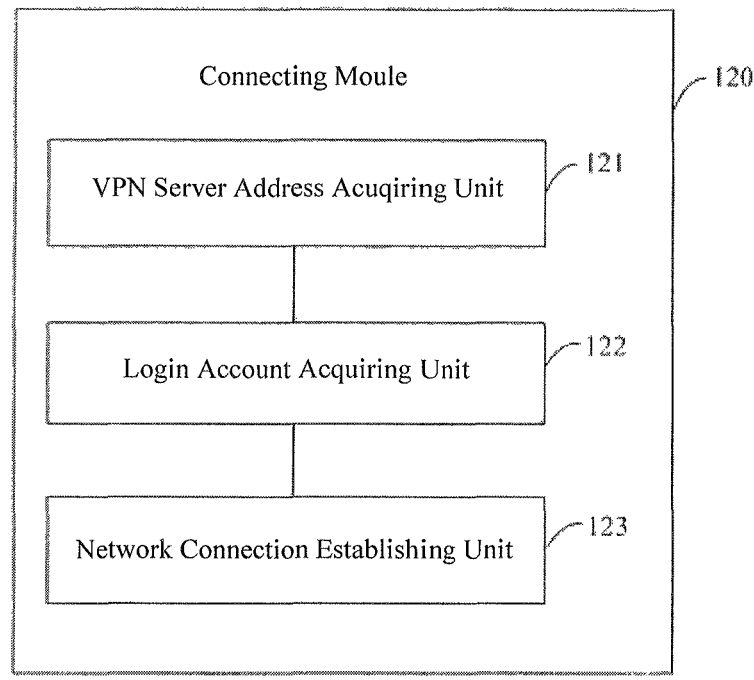
FIG. 5 is a schematic structural diagram of an embodiment of the connecting module shown in FIG. 4.

Please see FIG. 5, which is a schematic structural diagram of an embodiment of the connecting module shown in FIG. 4. The connecting module 120 comprises: a VPN server address acquiring unit 121, designed to acquire the address of the proprietary VPN server if the acquired IP address of the SIM card belongs to the address segments of the proprietary VPN server;

the address of the VPN server can be acquired from a preset server address information base, generally speaking, the address of the VPN server has the same Network ID as the IP address assigned by it to the client; thus, the server address that has the same Network ID as the IP address can be acquired in the server address information base, so that the VPN server to be accessed by the SIM card and the address of the said VPN server can be ascertained;

moreover, the server address information base can not only store the address of a proprietary VPN server for the SIM card in advance but also store the addresses of other servers accessed frequently by the user;

a login account acquiring unit 122, designed to acquire the login account for the proprietary VPN server;

the login account for the VPN server comprises: user name and password required for logging in the VPN server;

the login account for the proprietary VPN server can be acquired from a preset login account information base; on the premise that the proprietary VPN server to be accessed by the SIM card is ascertained in step S22, the login account for logging in the proprietary VPN server can be acquired in the login account information base according to the address and name of the VPN server;

moreover, the login account information base can store in advance not only login accounts required for the proprietary VPN server with the SIM card but also login accounts for servers that are frequently accessed by the user;

a network connection establishing unit 123, designed to establish a network connection to the proprietary VPN server according to the acquired address of the VPN server and the login account.

In the embodiments of the present invention, the VPN server accessed by the SIM card is ascertained on the basis of the IP address acquired from the server at the network side; thus, the VPN server can be connected automatically, and the user experience is improved.

Figure 6:
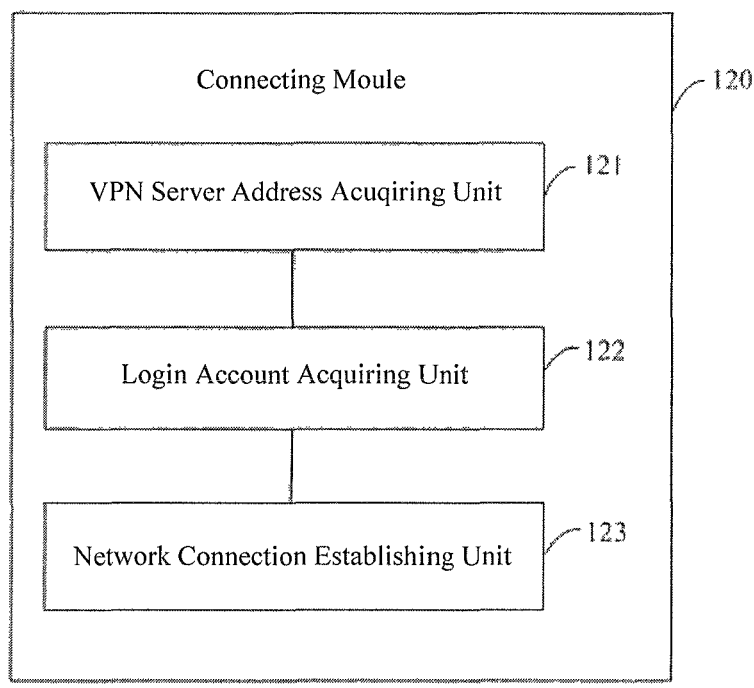
FIG. 6 is a schematic structural diagram of an embodiment of the VPN server address acquiring unit shown in FIG. 5.

Please see FIG. 6, which is a schematic structural diagram of an embodiment of the VPN server address acquiring unit shown in FIG. 5. The VPN server address acquiring unit comprises:

a first querying sub-unit 121A, designed to query for the address of the proprietary VPN server in the preset server address information base;

a first processing sub-unit 121B, designed to acquire the login account for the proprietary VPN server if the query made by the first querying sub-unit is successful; and, prompt the user to input the VPN server address and store the VPN server address inputted by the user into the server address information base if the query made by the first querying sub-unit is failed.

Figure 7:
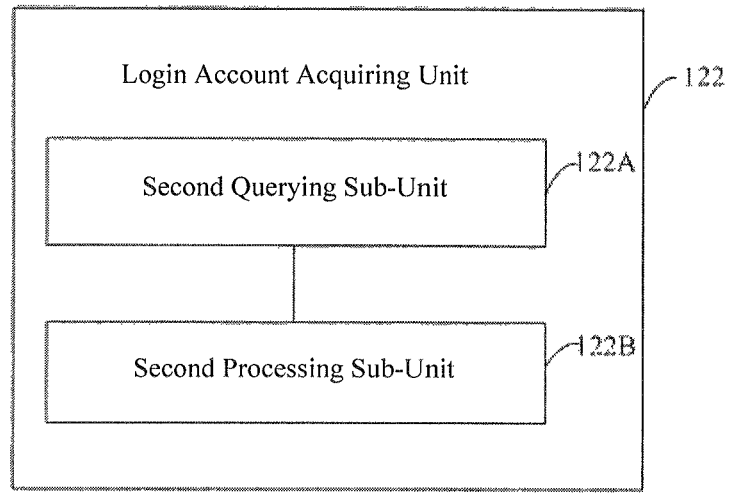
FIG. 7 is a schematic structural diagram of an embodiment of the login account acquiring unit shown in FIG. 5.

Please see FIG. 7, which is a schematic structural diagram of an embodiment of the login account acquiring unit shown in FIG. 5. The login account acquiring unit 122 comprises:

a second querying sub-unit 122A, designed to query for the login account for logging in the proprietary VPN server in the preset login account information base;

a second processing sub-unit 122B, designed to establish a network connection to the VPN server according to the address of the proprietary VPN server and the login account if the query made by the second querying sub-unit is successful; and, prompt the user to input an corresponding login account and store the login account inputted by the user into the login account information base if the query made by the second querying sub-unit is failed.

Figure 8:
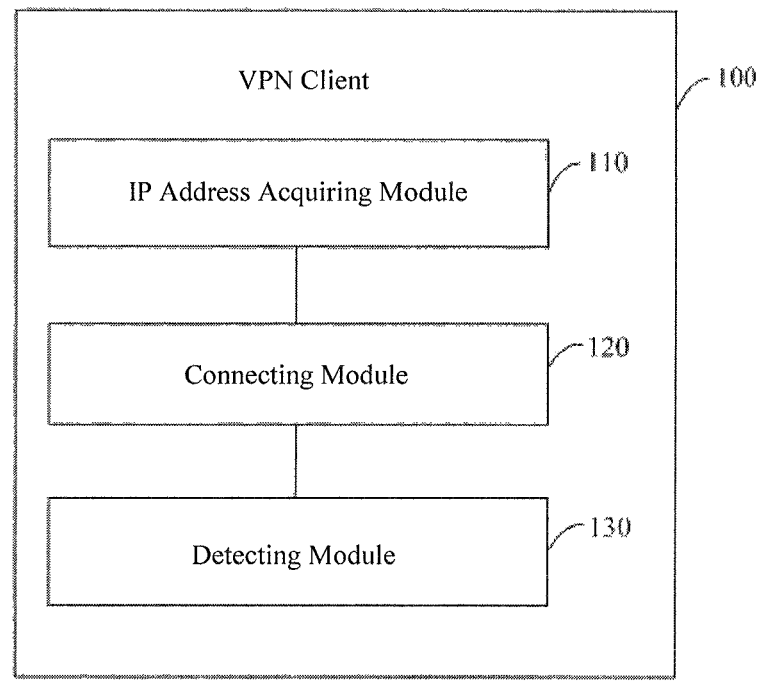
FIG. 8 is a schematic structural diagram of a third embodiment of the VPN client in the present invention.

FIG. 8 is a schematic structural diagram of a third embodiment of the VPN client in the present invention. The VPN client comprises:

an IP address acquiring module 110, designed to acquire the IP address assigned to a SIM card by a server at the network side, when dialing to the server at the network side is carried out successfully with the dial-up information built-in the SIM card;

the dial-up information built-in the SIM card comprises the Network ID of the operator to which the SIM card belongs, wherein, for example, the Network ID of China Mobile is 46000, and the Network ID of China Unicom is 46001;

before the IP address is acquired, the IP address acquiring module 110 monitors whether APN dialing is triggered by a user or an application program according to the dial-up information built-in the SIM card, and if successful dialing to the server at the network side (e.g., China Mobile or China Unicom) is detected, an IP address assigned by the server of the operator can be acquired at a p2p port;

a connecting module 120, designed to connect to the proprietary VPN server automatically if the acquired IP address of the SIM card belongs to the address segments of the proprietary VPN server;

the proprietary VPN server is a specific VPN server that can be accessed by the SIM card, wherein, the VPN server can be a server at the network side, which provides specific resources, such as educational resources or game resources, etc;

in the embodiments of the present invention, the VPN server accessed by the SIM card is ascertained on the basis of the IP address acquired from the server at the network side; thus, the VPN server can be connected automatically, and the user experience is improved;

a detecting module 130, designed to detect whether the network connection to the VPN server is interrupted, and, if the network connection is interrupted, establish the network connection to the VPN server again according to the acquired address of the proprietary VPN server and the login account.

In the embodiments of the present invention, the VPN server accessed by the SIM card is ascertained on the basis of the IP address acquired from the server at the network side; thus, the VPN server can be connected automatically, and the user experience is improved.

Those having ordinary skills in the art can understand that the process flows of the methods in the above embodiments can be implemented in part or in entirety by utilizing a computer program to instruct relevant hardware, the computer program can be stored in a computer readable storage medium, and the program can comprise the process flows of the embodiments of the methods described above when it is executed. Wherein, the storage medium can be a magnetic disk, optical disk, Read-Only Memory (ROM), or Random Access Memory (RAM), etc.

While the present invention is described and disclosed above in some preferred embodiments, the present invention is not limited to those embodiments. Those having ordinary skills in the art can appreciate that any equivalent modification or variation that can implement the process flows in the embodiments described above in part or in entirety on the basis of the claims of the present invention is deemed as falling in the protected scope of the present invention.

The invention claimed is:

1. A VPN (Virtual Private Network) server access method, wherein, comprising:

acquiring an IP address assigned to a SIM card by a server at the network side, when dialing to the server at the network side is carried out successfully with the dial-up information built-in the SIM card;

connecting to a proprietary VPN server automatically, if the acquired IP address of the SIM card belongs to the address segments of the proprietary VPN server;

wherein, the step of connecting to the proprietary VPN server automatically if the acquired IP address of the SIM card belongs to the address segments of the proprietary VPN server comprises: acquiring the address of the proprietary VPN server, if the acquired IP address of the SIM card belongs to the address segments of the proprietary VPN server; acquiring the login account for the proprietary VPN server; and establishing a network connection to the proprietary VPN server, according to the acquired address of the proprietary VPN server and the login account; and wherein, the step of acquiring the IP address of the proprietary VPN server if the acquired IP address of the SIM card belongs to the address segments of the proprietary VPN server comprises: querying for the address of the proprietary VPN server in a preset server address information base, if the acquired IP address of the SIM card belongs to the address segments of the proprietary VPN server; acquiring the login account for the proprietary VPN server, if the query is successful; and prompting the user to input the address of the proprietary VPN server, and storing the VPN server address inputted by the user into the server address information base, if the query is failed.

2. The method as set forth in claim 1, wherein, the step of acquiring the login account for the proprietary VPN server comprises: querying for the login account for the VPN server in a preset login account information base; establishing a network connection to the proprietary VPN server, according to the address of the VPN server and the login account, if the query is successful; and prompting the user to input an appropriate login account, and storing the login account inputted by the user into the login account information base, if the query is failed.

3. The method as set forth in claim 1, wherein, the method further comprises the following step after the step of establishing a network connection to the VPN server according to the acquired address of the VPN server and the login account:

detecting whether the network connection to the VPN server is interrupted, if the network connection is interrupted, establishing the network connection to the VPN server again according to the acquired address of the proprietary VPN server and the login account.

4. A VPN client implemented with a hardware processor and a hardware memory, comprising:

an IP address acquiring module, designed to acquire an IP address assigned to a SIM card by a server at the network side, when dialing to the server at the network side is carried out successfully with the dial-up information built-in the SIM card; and a connecting module, designed to connect to the proprietary VPN server automatically if the acquired IP address of the SIM card belongs to the address segments of the proprietary VPN server;

wherein, the connecting module comprises: a VPN server address acquiring unit, designed to acquire the address of the proprietary VPN server if the acquired IP address of the SIM card belongs to the address segments of the proprietary VPN server: a login account acquiring unit, designed to acquire the login account for logging in the proprietary VPN server; and a network connection establishing unit, designed to establish a network connection to the proprietary VPN server according to the acquired address of the VPN server and the login account; and wherein, the VPN server address acquiring unit comprises: a first querying sub-unit, designed to query for the address of the proprietary VPN server in the preset server address information base: and a first processing sub-unit, designed to acquire the login account for the proprietary VPN server if the query made by the first querying sub-unit is successful; and, prompt the user to input the VPN server address and store the VPN server address inputted by the user into the server address information base if the query made by the first querying sub-unit is failed.

5. The VPN client as set forth in 4, wherein, the VPN login account acquiring unit comprises: a second querying sub-unit, designed to query for the login account for the proprietary VPN server in the preset login account information base; and a second processing sub-unit, designed to establish a network connection to the VPN server according to the address of the proprietary VPN server and the login account if the query made by the second querying sub-unit is successful; and, prompt the user to input an appropriate login account and store the login account inputted by the user into the login account information base if the query made by the second querying sub-unit is failed.

6. The VPN client as set forth in claim 4, further comprising: a detecting module, designed to detect whether the network connection to the VPN server is interrupted, and, if the network connection is interrupted, establish the network connection to the VPN server again according to the acquired address of the proprietary VPN server and the login account.

\* \* \* \* \*